United States Patent Office 3,413,673
Patented Dec. 3, 1968

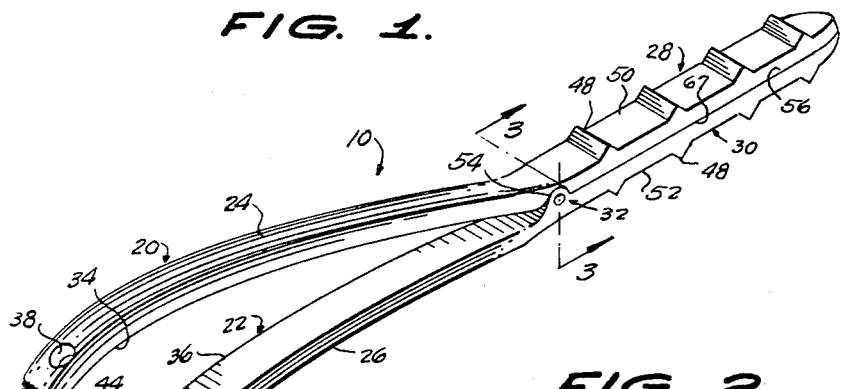

3,413,673
HANDLE MEANS FOR A DETACHABLE
CLEANING PAD
Carl S. Gewirz, 502 Garfield St. NW.,
Washington, D.C. 20008
Filed Mar. 29, 1966, Ser. No. 538,385
10 Claims. (Cl. 15—105)

ABSTRACT OF THE DISCLOSURE

Handle for use with a cleaning pad. The handle is insertable into a socket of the pad and has pivoted members which move away from each other to grip the interior of the pocket of the pad.

This invention relates to the general field of cleaning implements and, more specifically, the instant invention pertains to a manually operable handle especially designed and constructed to releasably receive and support a cleaning or scouring pad thereon.

One of the primary objects of this invention is to provide handle means comprising a pair of pivotally connected compound handle members each having a handle section and a tine projecting longitudinally from an end thereof, the construction being such that as the tines are pivoted to their closed juxtaposed positions to receive a cleaning pad thereover, the handle sections are pivoted away from each other, and when the handle members are pivoted in the reverse direction, the handle sections become juxtaposed and abutting relative to one another and the tines are moved away from one another to wedge within an encompassing pad to secure the same thereon.

Another object of this invention is to provide pan scraping means on the tines of the handle means, the pan scraping means also fuctioning as friction means to assist in the retention of the pad on the tines.

A still further object of this invention is to provide handle means of the type generally described supra wherein the pivotal connection between the handle members is of a noncomplex detachable type to permit the handle means to be easily cleaned and sterilized.

This invention contemplates as a still further object thereof, the provision of handle means to detachably receive and support a cleaning pad thereon, the handle means being noncomplex in construction and assembly, inexpensive to manufacture, and which is rugged and durable in use.

Other and further objects and advantages of the instant invention will become more evident from a consideration of the following specification when read in conjunction with the annexed drawing, in which:

FIGURE 1 is a perspective view of handle means according to one embodiment of this invention, the figure showing the component elements of the handle means in their respective inoperative position, and wherein the tines are shown in abutting juxtaposition relative to one another and ready to receive a cleaning or scouring pad thereon;

FIGURE 2 is a side elevational view of the device shown in FIGURE 1 with the component elements of the handle means moved to their respective operative positions wherein the tines have been pivoted away from one another to releasably retain an encompassing cleaning pad thereon;

FIGURE 3 is a detailed transverse cross-sectional view of the pivoting means as shown in FIGURES 1 and 2, FIGURE 3 being taken substantially on the vertical plane of line 3—3 of FIGURE 1, looking in the direction of the arrows;

FIGURE 4 is an end elevational view of the handle means as shown in FIGURE 2, FIGURE 4 being taken substantially on the vertical plane of line 4—4 of FIGURE 2, looking in the direction of the arrows;

FIGURE 5 is an exploded perspective view of a second embodiment of preferred detachable connecting means for use between the handle members;

FIGURE 6 is a fragmentary side elevational view illustrating a third preferred embodiment of the detachable pivoting means; and FIGURE 7 is a detailed transverse cross-sectional view of the pivoting means, FIGURE 7 being taken substantially on the vertical plane of line 7—7 of FIGURE 6, looking in the direction of the arrows.

Referring now more specifically to the drawings, reference numeral 10 designates, in general, a detachable handle for a conventional household mop pad, cleaning or scouring pad indicated at 12 and which is available for purchase on the open market. The pad 12 as shown herein may be of the sponge or steel wool types, for example, and the type of pad to employ will be dictated, of course, by its intended use. In FIGURE 2 of the drawings, the pad 12 is shown as being provided with a central pocket 14 having an access opening 16 formed in a side 18 thereof to serve an intended function.

The handle means 10, to which this invention is specifically directed is seen to comprise two compound handle members 20, 22, respectively, preferably formed of a suitable substantially rigid plastic material but which is possessed of some degree of resiliency, and which may be, optionally, transparent, opaque or colored. The material from which the handle means 10 is formed should be of the type which will resist deterioration under normal usage and which will withstand relatively high temperatures when submersed in liquid cleaning solutions.

Each of the handle members 20, 22 is relatively thin and has a substantially prolate cycloidic configuration in profile, each handle member including an arcuately shaped manually manipulated concave-convex handle section 24, 26, respectively, each terminating in an integrally connected longitudinally extending flat and substantially rectangular tine portion 28, 30, respectively, at one end thereof. As is clearly seen in FIGURE 2 of the drawings, the tines and handle sections are connected together to form an obtuse angle therebetween.

Pivotal connecting means denoted in general by reference numeral 32 are provided to connect the handle members 20, 22 together, the pivotal connecting means being located, preferably, at substantially the junction of each tine 28, 30 with its respective handle section 24, 26. Preferred embodiments of the pivotal connecting means 32 will be more specifically described infra.

As is clearly seen in FIGURE 2, the concave underside 34 of the handle section 24 is disposed in a curvilinear plane complementing the curvilinear plane of the convex upper side 36 of the handle section 26 in order that when the two handle sections 24, 26 are moved to their juxtaposed, closed and operative positions illustrated in the aforementioned figure, the two handle sections will mesh.

The free outer ends of the handle sections 24, 26 are formed with inwardly spaced transversely extending openings 38, 40, respectively, either of which may receive hook means (not shown) therethrough or other support means whereby the handle 10 may be hung from an upright wall when not in use. Optionally, the openings 38, 40 are so disposed relative to one another that the same are aligned to form a continuous opening when the handle sections 20, 22 are in their nested positions whereby both openings 38, 40 may receive the hook or other support means therethrough.

The outer terminus of the handle section 24 includes a reverted flange 42 disposed in spaced relation relative to an adjacent portion of the underside 34 and defines a socket 44 therebetween to releasably receive and retain an ogive shaped neb 46 integrally formed with the outer terminus of the handle section 26, as shown in FIGURE 2, when the handle sections 24, 26 are in their shown operative positions.

Each tine 28, 30 is provided with a plurality of longitudinally spaced, transversely extending and outwardly projecting elongated pyramidal corrugations 48 functioning, as will be described below, as friction or anti-skid means to releasably retain the pad 12 thereon. The corrugations 48 are disposed on the remotely disposed sides 50, 52 of the tines 28, 30 with the longitudinally extending apices thereof on one tine being parallel with the apex of each adjacent corrugation and with the transversely extending apices of the corrugations 48 formed on the other of the tines.

In the embodiment of this invention shown in FIGURES 1–3, inclusive, one of three preferred types of quickly and easily detachable pivotal connecting means 32 is illustrated. In these figures, the pivotal connecting means (see FIGURE 3), comprises an integrally formed substantially cylindrical barrel 54 which extends transversely across the inner end of the tine 30 from an edge thereof and adjacent its junction with the handle section 26. The barrel 54 projects above the plane of the inner side 56 of the tine 30 and extends across substantially one-half its width with the inner end of the barrel 54 confronting the inner end of an upwardly opening concave recess 58 formed in the tine 30. The axial length of the recess 58 is that of the remaining one-half of the width of the tine 30. The barrel 54 is formed with an axially extending passage 60 having its axis aligned with the axis of the concave recess 58. The tine 28 is identically constructed with the exception that the barrel 62 with its passage 64 and the downwardly opening concave recess 65 are carried on the underside 67 of the tine 28 and are reversed, left to right.

The barrels 54, 62 are fitted into the opposed recesses 58, 65 with the inner ends of the barrels preferably being disposed in abutting relation relative to one another, and the handle members 20, 22 are then pivotally connected together by means of a friction retained knockout pin 68 which is axially inserted in the passages 60, 64.

With the handle members 20, 22 constructed and assembled as described above, the handle means 10 is rendered operative by separating the handle sections 24, 26 to their open positions shown in FIGURE 1 causing the adjacent inner sides of the tines 28, 30 to close and abut one another. The inner sides 56, 67 are coplanar in this position and the abutting relationship between the tines 28, 30 limits, of course, the degree of pivotal movement of the handle sections 24, 26 away from one another.

With the tines 28, 30 in their juxtaposed abutting positions, the outer free ends of the tines 28, 30 are now inserted through the opening 16 provided in the pad 12 after which the handle sections 24, 26 are manually grasped by the operator and pivoted towards one another to cause the tines 28, 30 to pivot away from each other to expand in the pocket 14 (see FIGURE 2) and to cause the corrugations 48 to be forced into the pad 12 to releasably retain the same on the tines 28, 30.

As the handle sections 24, 26 pivot to their closed juxtaposed and abutting relationship shown in FIGURE 2, the handle sections 24, 26 are held in their nested position by means of the interlocking relationship between the neb 46 and the socket 44. The neb 46, when the handle sections 24, 26 are being moved to their closed positions, passes over their reverted flange 42 which, being somewhat flexible, yields to permit the neb 46 to enter the socket 44 and to be releasably secured therein by the flange 42 which locks therebehind.

The handle 10 may now be manually manipulated in the conventional manner in any cleaning or scouring operation for which the pad 12 was intended. The pad 12 may be easily removed and replaced through the simple expedient of separating the handle sections 24, 26 from their closed position shown in FIGURE 1, the neb 46 being forced from behind the flange 42. When the tines 28, 30 have been moved to their abutting juxtaposed position described above and shown in FIGURE 1, the operator may easily slide the pad 12 therefrom and replace the same if so desired.

As has been mentioned above, the handle means 10 may also be utilized as a scraping device for cleaning pots and pans, this object of the invention being achieved through the removal of the pad 12 and the closing of the handle sections 24, 26 to their respective positions shown in FIGURE 2. The corrugations 48 may then be frictionally engaged with such foodstuffs as may be found to adhere to the sides of the cooking vessel.

While one preferred form of pivotal connecting means has been described in the embodiment of this invention as illustrated in FIGURES 1–3, inclusive, the invention also contemplates two other preferred embodiments thereof, one of which is illustrated in FIGURE 5. The pivotal connecting means shown in FIGURE 5 and designated by the reference numeral 32' is seen to comprise substantially the same elements as those described above with the exception of the barrel 54'. In this embodiment of the invention, the barrel 54' is preferably made solid and is integrally connected at its inner end to one end of an elongated substantially cylindrical pin 68' which is adapted to be received within the passage 64' formed in a cylindrical barrel 62'. In this construction, the pin 68' overhangs the recess 58' and is coaxial with respect thereto. To assemble, the handle member 20 is inverted from its position as shown in FIGURE 5 in the direction of the arrow, after which the pin 68' is aligned with the passage 64' and the two handle members 20, 22 are moved laterally towards one another, the pin 68' entering the passage 64', the barrel 54' becoming seated in the recess 65', and the barrel 62' being received in the recess 58'.

In FIGURES 6 and 7 is illustrated a third embodiment of proposed pivotal connecting means, the same being herein designated by reference numeral 32''. These means include a pair of opposed integrally formed depending ears 70, 72 which project laterally from the opposed edges of the tine 28'', the ears 70, 72 being disposed at opposite sides of a downwardly opening transversely extending concave recess 73. The ears 70, 72 are provided with aligned and confronting pockets 74, 76, respectively, the function of which will be made known below.

The opposed edges of the tine 30'' are provided with a pair of opposed laterally projecting aligned pins 78, 80 which are integrally formed at the ends of a transversely extending raised convex rib 82. The rib 82 is adapted to be pivotally received within the concave recess 73, the pins 78, 80 being pivotally received within pockets 74, 76. The resiliency of the ears 70, 72 facilitate the easy engagement and disengagement of the pins 78, 80 with the pockets 74, 76.

In the several embodiments of the detachable connecting means 32, 32' and 32'' described and illustrated herein, special care has been taken to design the same so as to permit their ready assembly and disassembly for cleaning and sterilizing purposes without in any manner impairing the general utility of the handle means 10.

In this specification and the drawing, single and double primed reference numerals have been employed to identify and distinguish between corresponding elements of FIGURES 1–3, inclusive and it will be understood that the objects and functions of all of the embodiments of the invention disclosed herein remain the same from one to another.

Having described and illustrated a plurality of embodiments of this invention, it will be understood that the same are offered merely by way of example, and that this invention is to be limited only by the scope of the appended claims.

What is claimed is:

1. An article of manufauture comprising handle means, said handle means including a pair of elongated compound handle members each having a prolate cycloidic profile including an arcuately shaped handle section having one of an elongated substantially rectangular tine fixedly connected to and extending longitudinally from one end thereof, said handle sescond and tine of one of said members disposed in confronting relationship relative to the corresponding handle section and tine of the other of said handle members, and coperating means on each of said handle sections adjacent their said one ends and said one end of said tines to pivotally connect said handle members together whereby movement of said handle sections away from one another causes said tines to move into abutting relationship relative to one another, and movement of said handle sections in the opposite direction causes said handle sections to nest and said tines to move away from one another.

2. An article of manufacture defined in claim 1 wherein each of said tines is provided with a plurality of longitudinally spaced transversely extending corrugations on the remotely disposed sides thereof.

3. An article of manufacture as defined in claim 2, and means on the other end of each of said handle sections cooperating to releasably secure said handle sections in their said nested position.

4. An article of manufacture as defined in claim 2 wherein said pivotal connecting means includes a substantially cylindrical barrel extending transversely and partially across each of said tines from an edge thereof and adjacent its said one end, said tines each having a concave recess formed therein extending inwardly from its other edge and communicating at its inner end with the inner end of its said barrel, said barrel of each tine being received within said recess of the other of said tines, and pin means extending between and connecting said barrels.

5. An article of manufacture as defined in claim 4 wherein each of said barrels is provided with an elongated axially extending passage with said passage being aligned with one another, and said pin is inserted within said pasages and is frictionally retained therein.

6. An article of manufacture as defined in claim 5 wherein said corrugations each have a pyramidal configuration with the apices thereof being parallel with one another.

7. An article of manufacture as defined in claim 6 wherein the adjacent inner sides of said handle sections are disposed in curvilinear planes and the adjacent sides of said tines are planar.

8. An article of manufacture as defined in claim 7 wherein said releasable securing means comprises a reverted flange at the other end of said handle sections, said flange being disposed in spaced relation relative to said one of said handle sections to form a pocket therebetween, and the other end of said handle sections terminating in a neb releasably receivable within said pocket.

9. An article of manufacture as defined in claim 2 wherein said pivotal connecting means includes a substantially cylindrical barrel extending transversely and partially across each of said tines from an edge thereof and adjacent its said one end, said tines each having a concave recess formed therein extending inwardly from its other edge and communicating at its inner end with the inner end of its said barrel, said barrel of each tine being received within said recess of the other of said tines, a pin having an end thereof fixedly secured to the inner end of one of said barrels with the other end of said pin extending across said recess formed in its said tine coaxially with respect thereto, and said barrel on the other of said tines being provided with an axially extending passage to receive the other end of said pin therein.

10. An article of manufacture as defined in claim 2 wherein said pivotal connecting means includes a pair of oppositely disposed ears depending, respectively, from the opposed edges of one of said tines adjacent its said one end, said ears each being provided with an inwardly opening pocket and with said pockets being disposed in confronting relationship relative to one another, said one tine having a transversely extending concave recess formed therein opening at its opposed ends into said pockets, the other of said tines adjacent its said one end having a raised transversely extending rib formed thereon adapted to be received within said last named recess, said rib terminating at its opposed ends in outwardly projecting pins pivotally received within, respectively, said pockets.

References Cited

UNITED STATES PATENTS

| 456,356 | 7/1891 | Culver | 15—154 X |
| 1,296,290 | 3/1919 | Hunter | 15—149 |
| 2,168,497 | 8/1939 | Schupp | 15—212 |

FOREIGN PATENTS

| 336,785 | 1/1904 | France. |

WALTER A. SCHEEL, *Primary Examiner.*

LEON G. MACHLIN, *Assistant Examiner.*